United States Patent Office 2,895,173
Patented July 21, 1959

2,895,173

POROUS RESIN COMPOSITION AND METHOD OF USING AND PREPARING SAME

John K. Atticks, East Hartford, Conn., assignor to United Aircraft Corporation, East Hartford, Conn., a corporation of Delaware No Drawing. Application July 7, 1955
Serial No. 520,633

4 Claims. (Cl. 18—59)

The present invention relates to novel thermosetting plastic compositions which are strong, stable, light in density and have suitable shrinkage resistance. In particular, my plastic compositions find a great deal of usefulness in the filling of hollow airplane components, such as hollow steel propeller blades.

Objects and advantages of the invention will be set forth in part hereinafter and in part will be obvious herefrom, or may be learned by practice with the invention, the same being realized and attained by means of the compositions, combinations and improvements pointed out in the appended claims.

The invention consists in the novel compositions, combinations and improvements herein described.

An object of the present invention is to provide novel light density heat resistance plastic compositions of high strength at temperatures up to 300° F.

A further object of my invention is to provide novel light density plastic compositions having high impact strength at temperatures as low as −65° F.

Another object of my invention is to provide novel light density plastic compositions having high compressive and tensile strength.

A still further object of my invention is to provide novel light density plastic compositions having a high strength/weight ratio and which have suitable shrinkage resistance.

A still further object of my invention is to provide novel light density plastic compositions which may readily be loaded in cavities of preformed bodies, and particularly with respect to hollow airplane components, such as hollow steel propellers.

A further object of my invention is to provide novel light density plastic compositions which may be prepared in a simple manner and which may be cured in open ovens rather than dies, due to their low pressure generation on heating.

In order to obtain a light density plastic composition satisfying the foregoing objects, I have discovered the present invention. In general, my novel plastic compositions relate to plastic compositions having an overall light density of high strength and stability formed of a high density, high strength, high modulus matrix with a low density, low strength, low modulus dispersed phase.

In general, my novel compositions are prepared by curing a light density matrix, comprising a well blended and substantially dry mixture of short organic fibers and a compatible cementing resin, with pellets containing an expanding agent. During the curing operation, the cementing agent liquefies or softens, causing the fibers to be connected at random at their joint to give a loosely felted light density matrix, said matrix being compressed on the expansion of the expanding agent to a high density matrix with dispersed islands of low density dispersed phase. Because of the open structure of the light density matrix formed by the adhesions of the fibers at their joints, gases generated during the curing operation are readily vented, allowing the curing operation to be carried out in open ovens without the necessity of resorting to expensive molding operations.

It should be understood that my invention is not directed merely to the use of short organic fibers as reinforcing agents for thermosetting compositions to provide added strength. Such use is known as shown, for example, in Patent No. 2,683,697, in which I am a co-patentee. Moreover, neither is the expanding agent added to form thermosetting foam compositions such as disclosed in said patent, nor are my novel compositions molded thermosetting compositions of the type also disclosed in said patent. The present compositions possess an entirely different physical structure from the foam or molded compositions of my prior patent, resulting in unique properties possessed thereby. None of the compositions disclosed in prior Patent No. 2,683,697 have a high density, high strength, high modulus matrix with a dispersed low density, low strength, low modulus phase resulting in compositions which (1) have high heat resistance at temperatures as high as 250° F., (2) have high impact strength at temperatures as low as −65° F., (3) may be processed in ovens instead of dies because of the low internal gas pressure developed in curing thereof and (4) when used as a fill for hollow airplanes parts, reduces or eliminates stresses due to differences of coefficients of expansion between the metal sidewalls and organic fill, due to the presence of the dispersed low modulus phase. Comparison data is given hereinbelow showing the composition of the present invention to have superior tensile strength and impact strength to the compositions prepared in accordance with the process of Patent No. 2,683,697.

As mentioned hereinabove, the light density matrix adapted to be compressed during the curing operation comprises a finely divided blend of short organic fibers and a suitable cementing resin which is compatible therewith and which softens or liquefies on heating thereof so as to bond the fibers at their joints in random orientation. Thus, the fibers so bonded do not provide a cellular structure of a homogeneous mixture of fibers embedded in the cementing agent, but rather a non-cellular loosely felted structure of low density which is subsequently compacted on expansion of the expandable agent to a high density matrix.

Examples of suitable short organic fibers are the nylon polyamide (polyhexamethylene adipamide) fibers, such as those disclosed in U.S. Patent No. 2,683,697, including nylon flock and nylon bristle, rayon, fiber glass, "Orlon" (a synthetic acrylonitrile fiber) and "Dacron" (an oriented polyester or terephthalic acid with ethylene glycol).

The short chain organic fibers may vary as to diameter and length, depending upon whether it is in the form of a flock or bristle. Where the geometry of the part is complex and particularly where there are thin sections, a small diameter fiber, preferably about 0.02 mm., or as small as 0.01 mm. and with a length of 0.01 to 10.0 mm. and preferably not less than five times its diameter, can be used, but where the part is in the form of a regular solid such as a bar, slab, etc., the diameter may be as great as 1.0 mm. with a length generally in the range of 3.0 to 50 mm.

Examples of suitable cementing resins are the phenolic resins, such as Durez 12686 and Durez 13037 which are phenolic novolak resins produced by reaction of a phenol with cashew nut shell oil and which may be reacted to infusibility with hexamethylenetetramine, its equivalent or with aldehydes. Such resins are disclosed in the United States patents to Shepard, Boiney and Sontag No. 2,203,206, June 4, 1940, and in combination with various butadieneacrylonitrile rubbers in the patent to Shepard and Boiney No. 2,532,374, December 5, 1950. "Durez" 12687 is similar to "Durez" 12686 except that it incorporates a small proportion of hexamethylenetetramine.

Other useful resins include the epoxy resins, such as "Araldite An–100," a condensation product of epichlorohydrin and bisphenol having an epoxide equivalent of .22 to .26 equivalents.

If so desired, mixtures of cementing resins may be used as the cementing agents. Also, modifying resins may be added, such as "Buna N" (butadiene-acrylonitrile copolymers).

As will be evident to those skilled in the field, the cementing resin is added in sufficient quantity to cause adhesion of the short chain organic fibers during the curing operation. Generally, the range is about 20 to 95% by weight of fibers and 80 to 5% by weight of cementing agent, and preferably about 25% of fibers to about 75% of cementing agent.

In order to form my novel compositions, it is essential that the expanding agent for compacting the low density matrix to a high density matrix be present in the dispersible phase material and not in the low density matrix. As mentioned hereinabove, the dispersible phase material is in the form of pellets which may include also fillers, adhesive resins and any other conventional ingredients needed to effectuate pellet formation. Any suitable expanding agent that will expand below the melting temperature of the short organic fibers but at or above the softening or liquefying point of the cementing agent may be used. Examples of suitable expanding agents are hexamethylenetetramine, azo-bis-isobutyronitrile and 4-4 oxybis (benzene sulfonyl hydrozide). Examples of ingredients, in addition to the expandable agents, that may be present in the dispersed phase pellets are phenolic resins such as "Durez 12686" and "Durez 13037," rubber composition, including natural and synthetic rubbers, such as natural rubber and chloroprene (neoprene W), and acrylonitrilebutadiene copolymers, such as Hycar OR 15.

In general, the weight ratio between the light density matrix and the pellet containing the expanding material is in the range of 75–95% by weight of the matrix to 25–5% of the dispersed phase material, and preferably 85–90%.

The temperature of curing will, of course, vary depending upon the physical characteristics of the short chain organic fibers, the cementing agents and the expanding agent. The temperature must be below the melting point of the fibers, above the liquefying or softening point of the cementing agent, and above the temperature at which the expandable agent expands. Generally, the curing temperature is in a range of 300° to 375° F. As is well known to those skilled in the art, the time of curing likewise varies with the particular ingredients of the uncured composition in addition to the temperature employed, lower temperatures requiring a longer time for curing.

In order to describe the invention more specifically, the following specific examples are now given:

EXAMPLE I

A light density matrix is formed by blending 25% by weight of nylon flock with 75% by weight of nylon resin (polyhexamethylene adipamide). A pelleted dispersed phase is then prepared by mixing 100 parts by weight of butadiene-acrylonitrile (Hycar OR 15), 90 parts by weight phenolic resin (Durez 12686), 40 parts by weight (Durez 13037), 9 parts hexamethylenetetramine and 10 parts of 4,4' oxybis (benzene sulfonyl hydrozide). This dispersed phase composition is then mill mixed, sheeted and pelleted.

85 parts by weight of the matrix are then blended with 15 parts by weight of the pelleted dispersed phase material. This blend is then put into an open oven having a suitable cavity receptable and cured for 1 hour at 330° F. On heating, the nylon resin of the matrix softens, causing the nylon flock to join together in loosely felted random orientation to provide a light density matrix. On the expansion of the expanding agents, hexamethylenetetramine and 4,4' oxybis (benzene sulfanyl hydrozide), the matrix is compressed, giving a final overall light density product comprising a high density, high strength, high modulus matrix with a low density, low modulus, low strength dispersed phase.

EXAMPLE II

A low density, high strength composition prepared in the same manner as Example I, using as the matrix and the dispersed phase, the following compositions:

| | | |
|---|---|---|
| Matrix | percent | 85 |
| (1) Nylon flock | percent | 20 |
| (2) Nylon resin—FM 6501 | do | 55 |
| (3) Epoxy resin—Araldite AN–100 | do | 20 |
| (4) Nylon bristle | do | 5 |
| Dispersed phase | percent | 15 |
| (1) Butadiene-acrylonitrile (Hycar OR 15) | parts | 100 |
| (2) Phenolic resin (Durez 12686) | do | 90 |
| (3) Phenolic resin (Durez 13037) | do | 40 |
| (4) Hexamethylenetetramine | do | 9 |
| (5) 4,4' oxybis (benzene sulfonyl hydrazide) | do | 10 |

Examples of further compositions useful in forming the matrix in accordance with my invention are:

EXAMPLE III

| | Percent |
|---|---|
| Nylon flock 0.5 mm. dia. | 25 |
| Phenolic resin—pulverized | 50 |
| Butadiene—acrylonitrile rubber—powdered | 25 |

EXAMPLE IV

| | |
|---|---|
| Nylon flock 3 denier, 1 mm. | 25 |
| e-Caprolactam—pulverized | 75 |

EXAMPLE V

| | |
|---|---|
| Nylon flock 0.5 mm. dia. | 70 |
| Epoxy resin (Araldite AN–100) | 30 |

EXAMPLE VI

| | |
|---|---|
| Nylon flock 0.5 mm. dia. | 20 |
| Phenolic resin—pulverized | 40 |
| Polyvinyl formal—pulverized | 40 |

Another typical example of a useful dispersed phase material, including an expanding agent, is:

EXAMPLE VII

| | Parts |
|---|---|
| Chloroprene (neoprene W) | 100 |
| Whiting | 50 |
| Circo light process oil | 30 |
| 4,4' oxy bis (benzene sufonyl hydrozide) | 20 |

My novel compositions are particularly useful as fills for hollow airplane components, such as propeller blades, not only because of their outstanding physical properties at high and low temperatures, described in detail hereinbefore, but also because of the ease of loading the dry, well-blended composition in the uncured state, after which it is subjected to a curing operation so that the plastic is cured after it has been loaded in the airplane component. Hence, the present invention also includes my novel plastic compositions within preformed bodies. An example of such a filled body is as follows:

EXAMPLE VIII

The uncured composition of Example I, comprising a well-blended mixture of matrix and pellets containing an expandable agent, is loaded into the cavity of a hollow steel propeller blade until said cavity has been filled. The hollow blade is then heated at a temperature of 330° F. for 3 hours. The propeller blade is thus filled with a composition bonded to the side walls thereof which is a high strength, low density fill, consisting of a high density, high modulus, high strength matrix with dispersed islands of low density, low strength, low modulus, dispersed phase. The dispersed phase reduces or eliminates stresses due to differences of coefficients of expansion between the metal side walls of said propeller and the fill when the loaded propeller is subjected to a temperature change.

As mentioned hereinbefore, the compositions of the present invention have higher tensile strength and impact strength than those prepared in accordance with the process of U.S. Patent No. 2,683,697. A comparison Table I is shown hereinbelow, comparing a composition prepared in accordance with above Example II and a composition prepared in accordance with Example 5 of U.S. Patent No. 2,683,697.

Table I

|  | Ex. 2 | Ex. 5 |
| --- | --- | --- |
| Tensile strength—p.s.i. 250° F | .398 | .240 |
| Impact—Ft. lbs./in. −50° F | .468 | .106 |

The invention in its broader aspects is not limited to the specific compositions, combinations and improvements described, but departures may be made therefrom within the scope of the accompanying claims without departing from the principles of the invention and without sacrificing its chief advantages.

I claim:

1. A process for the manufacture of overall light density, high strength filling material comprising blending together an expandable material comprising 5 to 25% by weight of pellets of a resinous material selected from the group consisting of phenol-aldehyde resins, natural rubber, butadiene-acrylonitrile copolymers and chloroprene polymers containing a normally solid agent decomposable at elevated temperatures to release nitrogen gas, 95 to 75% of a matrix comprising 20 to 95% of short fibers of an organic polymer selected from the group consisting of polyhexamethylene adipamide, cellulose acetate, polyacrylonitrile, a polyester which is the reaction product of terephthalic acid and ethylene glycol, and mixtures of the foregoing and from 80 to 5% of a dry particulate resinous cementing agent selected from the group consisting of an epoxy resin which is the reaction product of bis-phenol and epihalohydrin, phenol-aldehyde resins, polyhexamethylene adipamide and mixtures of the foregoing, said cementing agent having a lower melting point than the short organic polymer fibers and not higher than the temperature at which the expanding agent is activated, heating said blended mixture of pellets and matrix to a temperature whereby the cementing agent melts and the decomposable agent in the expandable material gasifies causing expansion of said expandable material which in turn causes the matrix to be compacted to form a disperse phase of low density, low modulus expanded resinous material within a high modulus, high strength compacted matrix of said fibers and cementing agent.

2. A filling material prepared in accordance with the process set forth in claim 1.

3. A process for the manufacture of overall light density, high strength filling material as set forth in claim 1, wherein the expandable material comprises from 10 to 15% of the filling material and is itself comprised of about 100 parts of butadiene-acrylonitrile and about 130 parts of phenol-aldehyde resins and containing as expanding agents about 9 parts of hexamethylenetetramine and about 10 parts of 4,4' oxy bis (benzene sulfonyl hydrazide) and from 90 to 85% of a matrix wherein the short organic fibers are made of polyhexamethylene adipamide which comprise 25% of said matrix and the cementing agent is a mixture of about 55% polyhexamethylene adipamide and about 20% of an epoxy resin formed by the reaction between bis-phenol and epichlorohydrin.

4. A process for filling the hollow preformed body comprising substantially filling the cavity with a dry, blended composition comprising 5 to 25% by weight of expandable pellets of a resinous material selected from the group consisting of phenol-aldehyde resins, natural rubber, butadiene-acrylonitrile copolymers and chloroprene polymers containing a normally solid agent decomposable at elevated temperatures to release nitrogen gas, 95–75% of a matrix comprising 20–95% of short fibers of an organic polymer selected from the group consisting of polyhexamethylene adipamide, cellulose acetate, acrylonitrile, a polyester which is the reaction product of terephthalic acid and ethylene glycol, and mixtures of the foregoing and from 80 to 5% of a dry particulate resinous cementing agent selected from the group consisting of an epoxy resin which is the reaction product of bis-phenol and epihalohydrin, phenol-aldehyde resins, polyhexamethylene adipamide and mixtures of the foregoing, said cementing agent having a lower melting point than the short organic polymer fibers and not higher than the temperature at which the expanding agent is activated, heating said blended mixture of pellets and matrix to a temperature whereby the cementing agent melts and the decomposable agent in the expandable pellets gasifies causing expansion of said expandable pellets which in turn causes the matrix to be compacted to form a disperse phase of low density, low modulus expanded resinous material within a high modulus, high strength, compacted matrix of said fibers and cementing agent.

References Cited in the file of this patent

UNITED STATES PATENTS

| 1,843,886 | Semmes | Feb. 2, 1932 |
| 2,566,701 | Griese | Sept. 4, 1951 |
| 2,683,697 | Newell et al. | July 13, 1954 |
| 2,706,311 | Durst et al. | Apr. 19, 1955 |